US012413080B2

(12) United States Patent
Shafi et al.

(10) Patent No.: US 12,413,080 B2
(45) Date of Patent: Sep. 9, 2025

(54) WIRELESS BATTERY CHARGING

(71) Applicant: Amazon Technologies, Inc., Seattle, WA (US)

(72) Inventors: Mohammed Sameed Shafi, Mountain View, CA (US); Benjamin Thomas Gaide, San Jose, CA (US); Marko Bundalo, Munich (DE)

(73) Assignee: Amazon Technologies, Inc., Seattle, WA (US)

( * ) Notice: Subject to any disclaimer, the term of this patent is extended or adjusted under 35 U.S.C. 154(b) by 560 days.

(21) Appl. No.: 17/940,509

(22) Filed: Sep. 8, 2022

(65) Prior Publication Data

US 2024/0097462 A1   Mar. 21, 2024

(51) Int. Cl.
*H02J 7/00* (2006.01)
*H02J 50/90* (2016.01)

(52) U.S. Cl.
CPC .......... *H02J 7/0036* (2013.01); *H02J 7/0048* (2020.01); *H02J 50/90* (2016.02)

(58) Field of Classification Search
CPC .... H02J 7/0036; H02J 7/0048; H02J 7/00034; H02J 50/80; H02J 50/90
USPC .......................................... 320/108; 307/104
See application file for complete search history.

(56) References Cited

U.S. PATENT DOCUMENTS

| | | | |
|---|---|---|---|
| 2010/0253281 A1 | 10/2010 | Li | |
| 2015/0349558 A1* | 12/2015 | Toya | H01M 10/44 320/110 |
| 2017/0133888 A1* | 5/2017 | Uchida | H02J 50/80 |
| 2018/0183254 A1 | 6/2018 | Park et al. | |
| 2022/0037925 A1 | 2/2022 | Wenchao et al. | |

FOREIGN PATENT DOCUMENTS

DE     10201178386 A1     1/2013

OTHER PUBLICATIONS

International Search Report and Written Opinion for PCT Application No. PCT/US23/73502 mailed Jan. 17, 2024, 13 pages.

* cited by examiner

*Primary Examiner* — Zixuan Zhou
(74) *Attorney, Agent, or Firm* — Eversheds Sutherland (US) LLP (57) ABSTRACT

Systems, methods, and computer-readable media are disclosed for improved wireless battery charging. The device may include a battery, and may be configured to determine that the battery is de-coupled from a wireless charger at a first time, determine that the battery is coupled to the wireless charger at a second time, determine that a first elapsed time between the first time and the second time is equal to or less than a first threshold, and cause charging of the battery to be disabled for a first time duration.

20 Claims, 6 Drawing Sheets

WIRELESS BATTERY CHARGING

BACKGROUND

Electronic devices may include batteries that can be charged wirelessly. Certain batteries may be subject to swelling, expanding, or otherwise changing form over time. For example, batteries can react to thermal events, age, corrosion, damage to components of the batteries, and other factors. Such factors may be impacted by a number of charge cycles completed by the battery. Noise due to changes in current and other issues during wireless charging may cause batteries to experience unnecessary charge cycles. Accordingly, improved wireless battery charging may be desired.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be configured for wireless charging. For example, devices may include rechargeable batteries that can be charged wirelessly, such as via inductive charging, magnetic charging, near field communication protocol charging, and other wireless charging methods. During wireless charging, devices and/or batteries of the devices may establish wireless charging connections with a wireless charger for energy transfer. At times, such wireless charging connections may be disrupted due to electrical noise, which may be caused by sudden changes in current or other factors. Using a device to playback video or audio content, causing a device to present haptic feedback, and other actions during wireless charging may increase the likelihood of electrical noise, and may therefore increase the likelihood of the wireless charging connection being disrupted. If the wireless charging connection is disrupted, the wireless charging connection may be disconnected or de-coupled, and then may reconnect or may otherwise be reestablished within a time interval or duration, such as within 10 seconds. Such disconnecting and reconnecting may be undesirable for a number of reasons. For example, such disconnecting and reconnecting may increase a likelihood of damage to the battery due to thermal events, increase in a number of charge cycles completed by the battery, and the like. In addition, such disconnecting and reconnecting may negatively impact a user experience, as the user may be presented with audio or visual notifications of the charging and not charging statuses of the battery within a short timeframe, which may be particularly undesirable during playback of audio or video-based content.

Embodiments of the disclosure reduce the likelihood of disconnections during wireless charging by allowing for determinations as to whether a disconnection was due to electrical noise, and by allowing for suppression or cancelation of unnecessary notifications to users where disconnection and/or reconnection of wireless charging occurs within a certain timeframe. Certain embodiments may decrease the likelihood of damage to batteries by preventing reconnection of wireless charging where unnecessary, such as when a battery is fully charged and/or when the battery has not been discharged a certain amount before the reconnection occurs. Some embodiments include time-based metrics that can be used to determine whether to enable or disable wireless charging, as well as to determine whether to trigger a charging protection sequence.

This disclosure relates to, among other things, systems, methods, computer-readable media, techniques, and methodologies for improved wireless charging that results in a reduced likelihood of battery damage, and increases battery longevity by filtering out unnecessary wireless charging events. Embodiments may improve a user experience with a device by managing notifications of "charger coupled" and/or "charger de-coupled" notifications presented to users.

Figure 1:
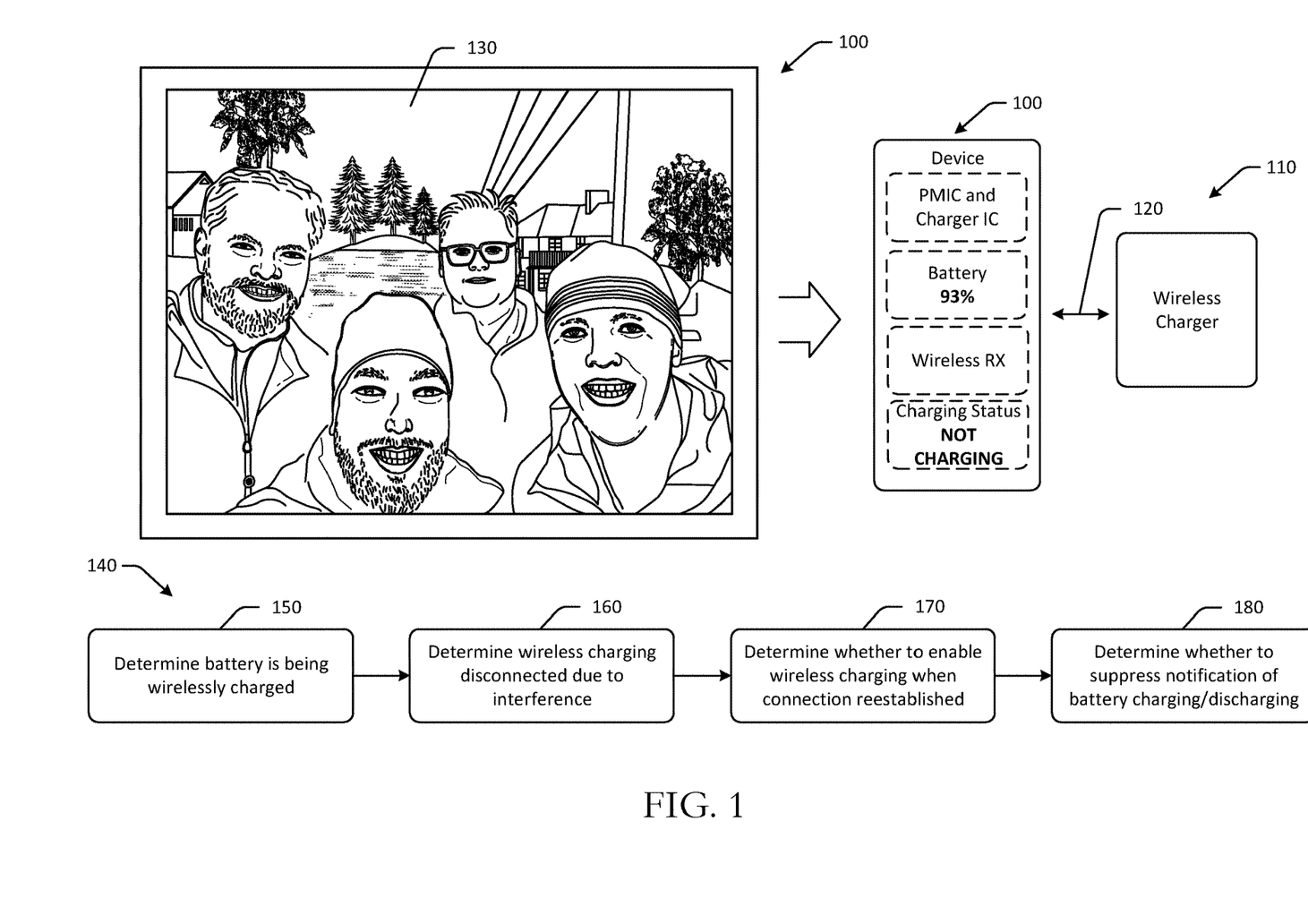
FIG. 1 is a schematic drawing of an example use case of improved wireless battery charging in accordance with one or more embodiments of the disclosure.

Referring to FIG. 1, an example use case of improved wireless battery charging is depicted in accordance with one or more embodiments of the disclosure. A device 100 may include a rechargeable battery configured to be wirelessly charged, and may be any suitable portable device, such as a mobile device, a docked tablet device, an e-reader, a tablet, an audio or video streaming device, an Internet of Things (IoT) device, a product ordering button or device, a home sensor, an aging in place device, an earphone, a speaker device, or another device. In the example of FIG. 1, the device 100 may be a tablet with a rechargeable battery. The battery may be any suitable type of battery, such as a lithium-ion battery, and the like. The battery may power the device. The battery 120 may be recharged via a connection to a wireless charging device or wireless charger 110.

The device 100 may include a power management integrated circuit (PMIC) and a charger integrated circuit, the rechargeable battery, and a wireless receiver configured to facilitate wireless charging in conjunction with the wireless charger 110. The battery may be wirelessly charged via wireless charging connection 120. However, at times, the wireless charging connection 120 may be disrupted. For example, if the device 100 is being used to present video and/or audio content 130 during wireless charging, noise due to the audio and/or video presentation may interrupt the wireless charging connection 120. In the event of such disruption, embodiments of the disclosure may implement one or more processes to manage subsequent reconnection and/or wireless charging, as well as actively manage notifications of such disruption as presented to a user (e.g., audible sounds, popup or other visual notifications, etc.).

Embodiments may therefore detect abnormal battery charger behavior, such as when the battery has completed charging when coupled to a wireless charger to enhance battery safety, reliability, and performance Embodiments may detect intermittent disconnects in the wireless charging protocol or connection 120, and may determine factors such as a state of charge of the battery, a length of time the battery has spent on the wireless charger, and/or other factors to determine whether the battery is experiencing events that negatively impact the battery health. Using these different detection methods inputs, actions can be automatically implemented to modify the battery charge algorithm and reduce stress on the battery and reduce or eliminate the possibility of generating gaseous swell.

When a battery operated device is coupled to a wireless charger, the device negotiates power transfer capability periodically to continue providing power to the device under charge. The battery operated device can provide user functionality (e.g., playing video and audio, etc.) while it is coupled to a wireless charger. This user functionality causes power draw from the wireless charger in addition to the power draw to charge the battery of the device. Interference between these two power draws from the same wireless charging source on the device can cause packet corruption in the periodic negotiation protocol or wireless charging connection 120 between the wireless charger and the device. This interference can reset the wireless charging protocol, resulting in a momentary drop of power to the battery operated device, until the power transfer capability is renegotiated. Unlike with wired charging, wireless charging removes the charging voltage from the device during interference. This momentary disconnect of power to the battery operated device can result in a new charging cycle to the battery, where the battery charging algorithm resets, and can initiate a number of processes, such as a constant current, constant voltage, and charge termination battery charging processes or stages. Such momentary disconnects may not be a result of user-induced wireless charger removal, and can result in a fully charged battery continuing to remain at a high state of charge.

An example process flow 140 is illustrated in FIG. 1. At a first operation 150, a determination may be made as to whether a device is being wirelessly charged. For example, the device may determine whether the wireless charging protocol or wireless charging connection 120 is active. If a wireless charging connection is established, the device may determine that the batter is being wirelessly charged. At a second operation 160, the device and/or a remote server may determine that the wireless charging was de-coupled due to interference. To make such a determination, the device may consider a number of factors, such as whether audio or visual content is being presented at the device, whether the device has been physically moved as indicated by accelerometer data, historical disconnection events associated with the particular wireless charger, and/or other factors such as those discussed with respect to FIGS. 2-5. At a third operation 170, the device and/or a remote server may determine whether to enable wireless charging when a connection is reestablished. For example, the device may determine that a wireless charging connection is reestablished. The device may determine whether to enable wireless charging based at least in part on a number of factors, such as an elapsed time since the most recent disconnection, a present state of charge of the battery, whether the device has been physically moved, how long the device has been charging at the wireless charger, and/or other factors. At a fourth operation 180, the device may determine whether to suppress a notification of the battery charging and/or discharging. For example, regardless of whether the wireless charging is enabled or disabled, the device may or may not delay and/or suppress a notification indicative of the charging or discharging/disconnection of a charger so as to avoid negative impact to a user experience of the device.

As a result, the battery may be charged when needed regardless of interruption or disruption to a wireless charging protocol or connection. Device runtime and/or longevity of usage may be increased. By managing and/or configuring the wireless charging, thermal events and/or swelling or other undesired occurrences may be reduced or avoided.

In one example embodiment, a device may include a battery and a controller. The controller may be configured to determine that the battery is coupled to a wireless charger, where the wireless charger charges the battery wirelessly, and to determine that the battery is de-coupled from the wireless charger at a first time. The controller may determine that the battery is re-connected to the wireless charger at a second time, and may determine that the device was presenting audio and video at the second time. The controller may determine that a first elapsed time between the first time and the second time is less than a first threshold, such as less than one minute. The controller may determine that a first state of charge of the battery at the second time is at least equal to a second threshold, such as 95% of maximum capacity, after the battery was fully charged as indicated by a state of charge indication during a previous time interval and/or during a present charging session. The controller may cause wireless charging and/or charging by any power source, including wired charging, of the battery to be disabled while the device is coupled to the wireless charger for a time interval, such as for a number of minutes, or until the battery is discharged by a certain amount. The device may cause presentation of a battery charging notification to be disabled during the time interval.

Some embodiments may account for disruption to wireless charging because a user removed the device from the wireless charger. For example, the controller may determine that the battery is coupled to the wireless charger at a third time, and may determine that the battery is de-coupled from the wireless charger at a fourth time. The controller may determine that a first value indicative of a likelihood that the device was removed from the wireless charger is greater than a threshold, and may determine that the battery is coupled to the wireless charger at a fifth time. The controller may cause wireless charging of the battery to be enabled.

Nonetheless, the device may limit wireless charging to a threshold amount, such as one hour, or 20 hours in any given timeframe, such as a 24 hour period. For example, the controller may determine that the battery is coupled to the wireless charger at a third time, and may determine that the battery is de-coupled from the wireless charger at a fourth time. The controller may determine that a second elapsed time between the third time and the fourth time is greater than 20 hours, and may determine that the battery is coupled to the wireless charger at a fifth time. The controller may determine that a third elapsed time between the fourth time and the fifth time is less than one minute, and may cause wireless and/or wired charging of the battery to be disabled.

Example embodiments of the disclosure provide a number of technical features or technical effects. For example, in accordance with example embodiments of the disclosure, certain embodiments of the disclosure may include batteries that can be wirelessly charged without interruption when a device is being used for presentation of content and/or there is additional power draw from the wireless charger while the device is coupled to the wireless charger. Some embodiments may include devices configured to determine device usage metrics, battery usage metrics, lengths of elapsed time, and other metrics. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
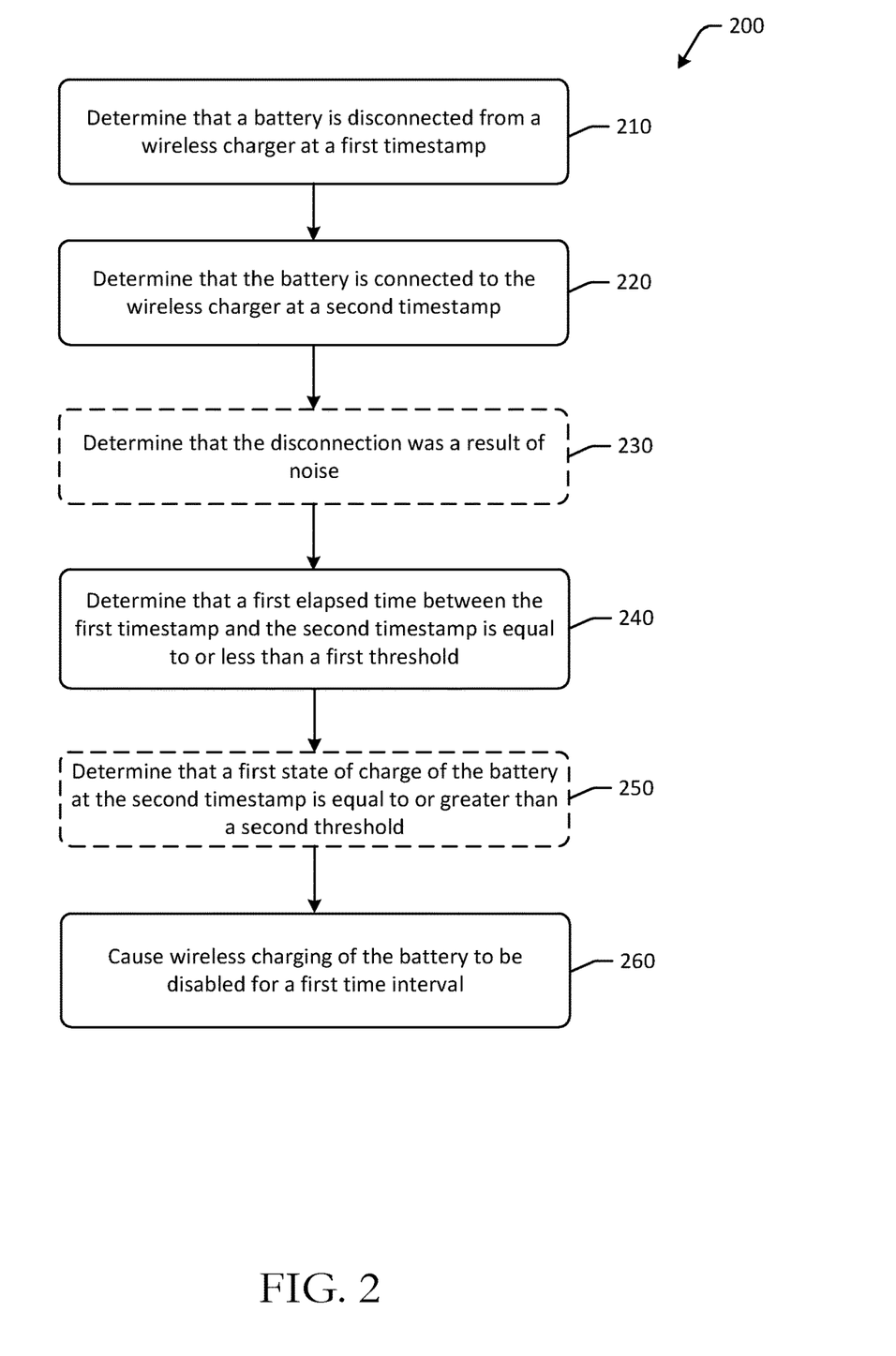
FIG. 2 is an example process flow for improved wireless battery charging in accordance with one or more embodiments of the disclosure.

FIG. 2 is an example process flow 200 for improved wireless battery charging in accordance with one or more embodiments of the disclosure. One or more of the operations of FIG. 2 may be performed at a client device and/or remote server in some embodiments. One or more of the operations of the process flow 200 may be optional and may be performed in any order or at least partially concurrently in some embodiments.

In some embodiments, the process flow 200 may be executed at a device that is coupled to a wireless charger and/or a device with a battery that is being wirelessly charged. The device may include a battery, memory configured to store computer-executable instructions, and at least one computer processor configured to access the memory and execute the computer-executable instructions to perform one or more of the operations presented in FIG. 2.

At block 210 of the process flow 200, the device may determine that the battery of the device is de-coupled from a wireless charger at a first time. For example, one or more computer processors may execute one or more modules having computer-executable instructions to determine that the battery of the device is de-coupled from a wireless charger at a first time. The device may determine that the device is no longer coupled to the wireless charger and/or that wireless charging of the battery has ceased. In some instances, negotiation of the wireless charging protocol may be restarted and/or an attempt to reestablish a wireless charging connection may be signals used to determine whether a battery is de-coupled from the wireless charger.

At block 220 of the process flow 200, it may be determined that the battery is coupled to the wireless charger at a second time. For example, one or more computer processors may execute one or more modules having computer-executable instructions to determine that the battery is coupled to the wireless charger at a second time. The device may determine that the wireless charging protocol has been renegotiated and/or the wireless charging connection has been reestablished or otherwise established. In some embodiments, the device may determine that the wireless charger is the same wireless charger that the device was de-coupled from at block 210, such as by comparing a device identifier of the charger to the device identifier of the wireless charger at block 210.

At optional block 230 of the process flow 200 it may be determined that the disconnection was a result of noise, such as electrical noise and/or a sudden change in current. For example, one or more computer processors may execute one or more modules having computer-executable instructions to determine that the disconnection was a result of noise, such as electrical noise and/or a sudden change in current. In some embodiment, the device may determine a likelihood that the disconnection was due to noise, and may compare the likelihood or corresponding representative value to a threshold to determine whether or not the disconnection was the result of noise. Other factors, such as historical disconnection data associated with a particular battery and/or particular wireless charger, whether or not the device was physically moved as evidenced by accelerometer data (e.g., the device may receive, from a remote server, an indication of device movement associated with user motion based on the accelerometer data, or an indication the accelerometer data corresponds to user motion, etc.), a length of elapsed time during which the device was de-coupled from the charger, and/or other factors may be used to determine a probability value or likelihood that the disconnection was a result of noise.

At block 240 of the process flow 200, it may be determined that a first elapsed time between the first time and the second time is equal to or less than a first threshold. For example, one or more computer processors may execute one or more modules having computer-executable instructions to determine that a first elapsed time between the first time and the second time is equal to or less than a first threshold. The first elapsed time may be a difference between the first time and the second time. The first threshold may be a value that, if the difference is less than the first threshold, it is likely the disconnection was due to noise, whereas if the difference is greater than the first threshold, the disconnection may likely not be due to noise. In some embodiments, the first threshold may be one minute, whereas in other embodiments, the first threshold may be 20 seconds, 40 seconds, 80 seconds, 100 seconds, or another value.

At optional block 250 of the process flow 200, it may be determined that a first state of charge of the battery at the second time is equal to or greater than a second threshold. For example, one or more computer processors may execute one or more modules having computer-executable instructions may be executed to determine that after the battery was fully charged during a preceding charging session and/or within a certain time interval, a first state of charge of the battery at the second time is equal to or greater than a second threshold. The state of charge of the battery may be the present charge relative to a maximum capacity of the battery. The second threshold may be represented by a percentage of maximum capacity of the battery in some embodiments, such as 85%, 90%, 95%, and so forth. The second threshold may be such that if the state of charge is equal to or greater than the second threshold, immediate recharging of the battery may not be necessary and can be delayed, such as in the event wireless charging of the battery was disrupted due to noise. In some embodiments, prior to causing wireless and/or wired charging of the battery to be disabled, the device may determine that a first state of charge of the battery at the second time is equal to or greater than a second threshold.

At block 260 of the process flow 200, wireless charging of the battery may be caused to be disabled for a first time interval. For example, one or more computer processors may execute one or more modules having computer-executable instructions may be executed to cause wireless and/or wired charging of the battery to be disabled for a first time interval. Because the elapsed time between the disconnection and reconnection events was less than the first threshold, and optionally because (i) the disconnection of the wireless charging was due to noise, and/or (ii) the first state of charge of the battery was equal to or greater than the second threshold, wireless and/or wired charging of the battery may be disabled temporarily for a first time interval. As a result, risk of damage to the battery due to thermal events is decreased, and battery longevity is improved. In addition, notifications regarding charger coupled or de-coupled may be suppressed or canceled so as to avoid impacting a user experience, as discussed in more detail with respect to FIG. 4.

Figure 3:
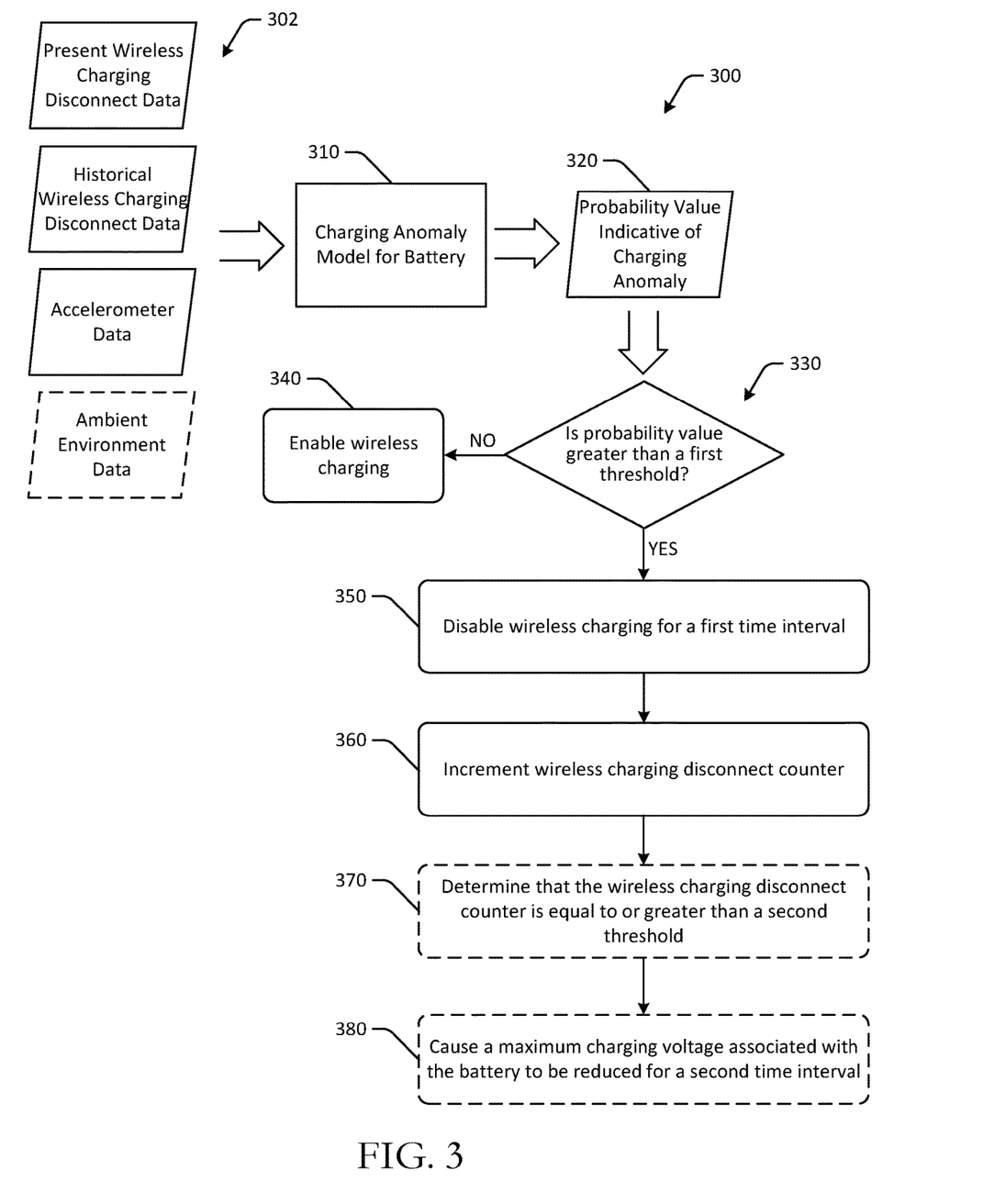
FIG. 3 is an example hybrid data and process flow for determining probability values and improving wireless battery charging in accordance with one or more embodiments of the disclosure.

FIG. 3 is an example hybrid data and process flow 300 for determining probability values and improving wireless battery charging in accordance with one or more embodiments of the disclosure. One or more of the operations of FIG. 3 may be performed at a client device and/or remote server in some embodiments. One or more of the operations of the process flow 300 may be optional and may be performed in any order or at least partially concurrently in some embodiments.

The data and process flow 300 may be used to determine a probability value indicative of whether a certain disconnection or reconnection event associated with a wireless charger was due to noise. Based at least in part on the probability value, one or more actions of the process flow can be implemented to improve a user experience and/or reduce a likelihood of damage to the battery.

A charging anomaly model for the battery 310 may be used to output a probability value 320 indicative of a charging anomaly, such as electrical noise or other anomalies. The charging anomaly model may be a battery charging algorithm configured to output the probability value, and may be a standalone algorithm and/or may be integrated with a battery charging algorithm that sends instructions to a PMIC or charger circuit of a device to control battery charging. One or more inputs 302 may be used by the charging anomaly model for the battery 310. For example, the charging anomaly model for the battery 310 may receive present wireless charging disconnect data, which may be indicative of a number of disconnect and/or reconnect events that have occurred in a preceding time interval, such as the last hour, or another metric, such as the number of disconnects or reconnect events that have occurred during a charging session. The charging anomaly model for the battery 310 may receive an input of historical wireless charging disconnect data, which may be specific to a particular wireless charger and/or may be specific to the device itself. The charging anomaly model for the battery 310 may receive an input of accelerometer data, which may be used to determine whether a disconnect event was due to a physical movement of the device, in which case notifications should not be suppressed. The charging anomaly model for the battery 310 may receive an optional input of ambient environment data, such as ambient light levels, presence of one or more users (e.g., as determined using a camera, microphone, etc.), whether the device is presenting audio and/or video content, and so forth, where if there are no users present notifications may not have to be suppressed as the notifications may not interrupt a user using the device. Based at least in part on one or more of these inputs, the charging anomaly model for the battery 310 may output the probability value 320.

The probability value 320 may be used at determination block 330, at which a determination may be made as to whether the probability value is greater that a first threshold. For example, the device may compare the probability value to the first threshold to determine whether the disconnection or connection event was due to a charging anomaly. If it is determined at determination block 330 that the probability value is not greater than the first threshold, the process flow may end at block 340, at which wireless charging may be enabled.

If it is determined at determination block 330 that the probability value is equal to or greater than the first threshold, the process flow may proceed to block 350, at which wireless and/or wired charging may be disabled for a time interval (e.g., temporarily disabled, etc.). At block 360, a wireless charging disconnect counter may be incremented, where the wireless charging disconnect counter may represent the number of disconnections that have occurred during a time interval and/or during a charging session. At optional block 370, the device may determine that the wireless charging disconnect counter is equal to or greater than a second threshold, which may indicate that the battery may be damaged if charging continues. At optional block 380, the device may cause a maximum charging voltage associated with the battery to be reduced for a second time interval (e.g., 24 hours or less, etc.), such as for a temporary time period so as to avoid overcharging of the battery and to provide additional time to avoid occurrence of a thermal event.

In some embodiments, the device may determine that the battery is coupled to the wireless charger at a third time, determine that the battery is de-coupled from the wireless charger at a fourth time, determine that a first value indicative of a likelihood that the device was removed from the wireless charger is greater than a threshold, and may determine that the battery is coupled to the wireless charger at a fifth time. The device may cause wireless charging of the battery to be enabled. The device may optionally determine accelerometer data associated with the device, where the first value is determined based at least in part on the accelerometer data. The device may optionally determine a device identifier associated with the wireless charger, and may determine a historical disconnect rate associated with the device identifier, where the first value is determined based at least in part on the historical disconnect rate. In some embodiments, prior to causing wireless and/or wired charging of the battery to be disabled, the device may determine that an ambient light level at the second time is equal to or greater than a second threshold. The historical disconnect rate may indicate a tendency for disconnections or de-coupling of wireless charging when a particular device is being charged by a particular charger. Due to different charging configurations, component placement, and so forth, charging disruptions may be different for different chargers when used with different devices. Accordingly, by tracking de-coupling rates for particular chargers, such historical data can be used to increase accuracy of determinations of whether a de-coupling was due to electrical noise.

Figure 4:
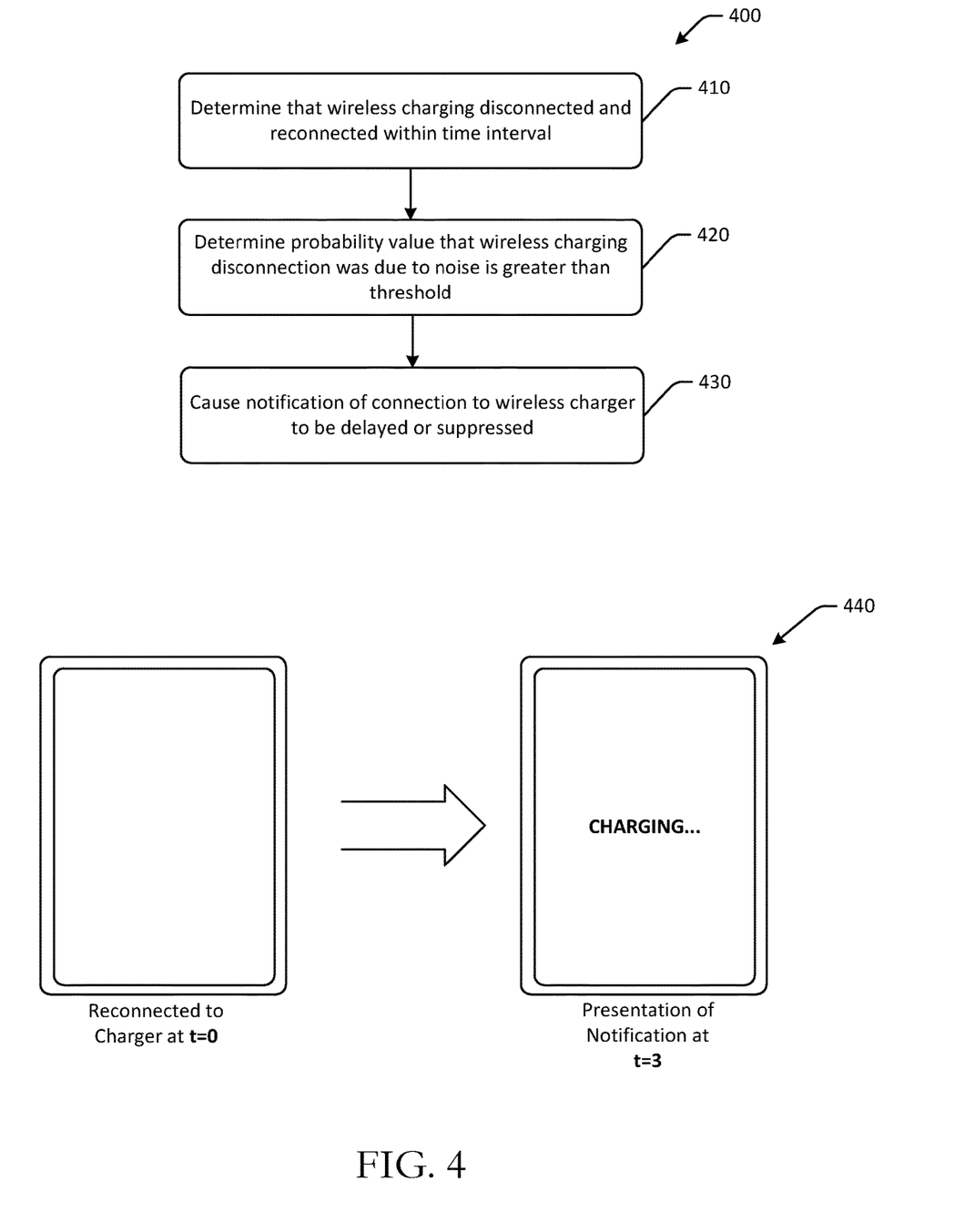
FIG. 4 is a schematic drawing of an example process flow and use case for handling charging connection notifications in accordance with one or more embodiments of the disclosure.

FIG. 4 is a schematic drawing of an example process flow 400 and use case 440 for handling charging connection notifications in accordance with one or more embodiments of the disclosure. One or more of the operations of FIG. 4 may be performed at a client device and/or remote server in some embodiments. One or more of the operations of the process flow 400 may be optional and may be performed in any order or at least partially concurrently in some embodiments.

In FIG. 4, notifications may be presented to a user indicative of whether a charger is coupled to, or has been de-coupled from, a device. Such notifications may be audible or visual notifications. However, when disruptions to wireless charging occur and then wireless charging is reestablished, the user may be presented a number of notifications in succession, which may be undesirable. Accordingly, embodiments may cause certain notifications to be canceled or delayed for a certain amount of time.

An example of a delayed notification is presented in use case 440, where a device is reconnected to a wireless charger at t=0, and instead of a notification being presented at t=1 as it typically would be, the notification is presented at t=3 or at another delayed time. In this example, the notification is delayed, and may be presented because the reconnection was not due to noise, but was instead due to a user physically moving the device resulting in the disruption to wireless charging. In other embodiments, if the disruption was due to noise, the notification may be canceled or otherwise suppressed.

At block 410 of the process flow 400, it may be determined that the wireless charging was de-coupled and reconnected within a time interval. For example, one or more computer processors may execute one or more modules having computer-executable instructions to determine that the wireless charging was de-coupled and reconnected within a time interval, such as one minute or another value.

At block 420 of the process flow 400, it may be determined that a probability value that the wireless charging disconnection was due to noise is greater than a threshold. For example, one or more computer processors may execute one or more modules having computer-executable instructions to determine that a probability value that the wireless charging disconnection was due to noise is greater than a threshold, where the probability value may be determined as discussed at least with respect to FIG. 3. In the example process flow of FIG. 4, the probability value may indicate that the disconnection and reconnection was due to electrical noise.

At block 430 of the process flow 400, a notification of the connection to the wireless charger may be caused to be delayed or suppressed. For example, one or more computer processors may execute one or more modules having computer-executable instructions to cause a notification of the connection to the wireless charger to be delayed or suppressed. In the example process flow of FIG. 4, the presentation of the notification may be delayed as depicted in the use case 440. In other embodiments, notifications may be presented without audio and/or may be canceled.

In embodiments, at periodic intervals, the device may monitor battery voltage and battery state of charge. Once the device determines that the battery is fully charged, charging may be disabled. Each time the wireless charger disconnects, the device may initiate a timer to estimate the wireless charger disconnect duration. The device may also determine a likelihood or probability value the battery experienced a power transfer capability re-negotiation event with the wireless charger. The device compares this probability to a pre-defined threshold, and if the probability is equal to or greater than the threshold, the device disables charging and does not notify the user that there was a momentary disconnect. As the device ages, once a pre-defined threshold is exceeded, the device reduces the maximum battery voltage to improve battery reliability.

In some embodiments, the device may determine that the battery is coupled to the wireless charger at a third time, and may determine that the battery is de-coupled from the wireless charger at a fourth time. The device may determine that a second elapsed time between the third time and the fourth time is equal to or greater than a second threshold, such as a certain number of hours or relative hours (e.g., 20 hours in a 24 hour period, etc.) in a time interval, and may determine that the battery is coupled to the wireless charger at a fifth time. The device may determine that a third elapsed time between the fourth time and the fifth time is less than a third threshold (e.g., one hour, etc.) and cause wireless and/or wired charging of the battery to be disabled. For example, the third threshold may be used to reset a charging time counter (e.g., the second threshold, etc.). If the device is not de-coupled from the wireless charger for the third threshold length of time, the counter or timer may not be reset and wireless charging may remain disabled. In addition, the device may cause presentation of a battery charging notification to be disabled during the first time interval.

Figure 5:
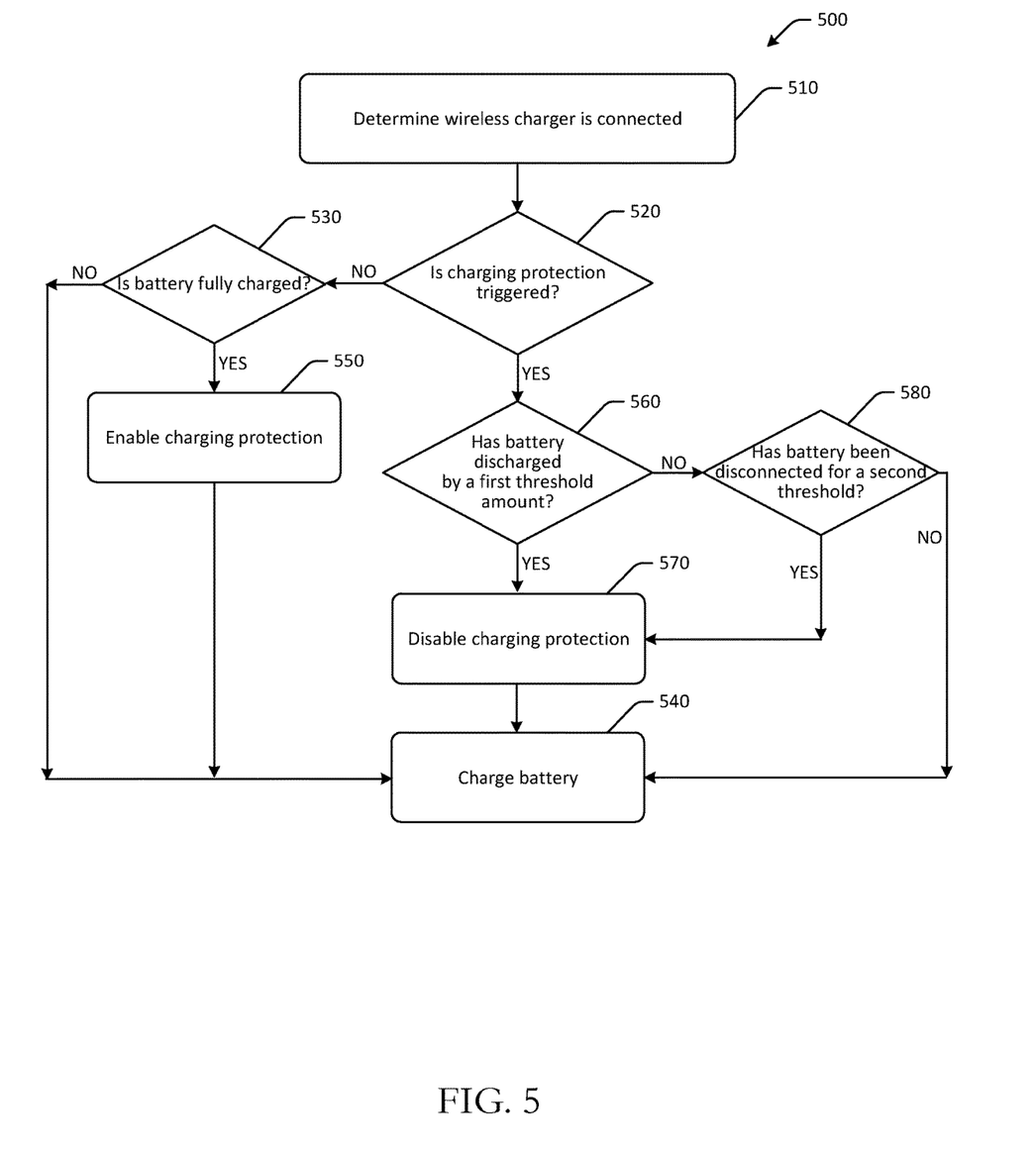
FIG. 5 is an example process flow for determining whether to trigger charging protection during wireless battery charging in accordance with one or more embodiments of the disclosure.

FIG. 5 is an example process flow 500 for determining whether to trigger charging protection during wireless battery charging in accordance with one or more embodiments of the disclosure. One or more of the operations of FIG. 5 may be performed at a client device and/or remote server in some embodiments. One or more of the operations of the process flow 500 may be optional and may be performed in any order or at least partially concurrently in some embodiments.

In FIG. 5, at block 510, a device may determine a wireless charger is coupled to the device and/or a battery of the device. At determination block 520, the device may determine whether charging protection has been triggered. For example, charging protection may be triggered if a certain number of disconnect and/or reconnections between a wireless charger and the device or its battery have occurred within a time interval. If charging protection has not been triggered, the process flow 500 may proceed to determination block 530, at which a determination may be made as to whether the battery is fully charged. For example, the device may determine a present state of charge of the battery and may use the state of charge to determine that the battery is fully charged. If the determination at determination block 530 is negative in that the battery is not fully charged, the process flow 500 may end at block 540, at which the battery may be charged. If the determination at determination block 530 is positive in that the battery is fully charged, the process flow 500 may proceed to block 550, at which charging protection is enabled, and then may end at block 540 at which the battery is charged. However, if a subsequent wireless charger connection event is detected, the determination at determination block 520 will be positive as a result of block 550.

If the determination at determination block 520 is positive in that charging protection has been triggered, the process flow 500 may proceed to determination block 560, at which a determination may be made as to whether the battery has discharged by a first threshold amount. For example, the device may determine whether the battery has discharged by a first threshold amount, which may be represented as a relative percentage (e.g., 5% of a maximum, etc.), a certain voltage (e.g., 100 mV, etc.), or another value. If the determination at determination block 560 is positive in that the battery has discharged by the first threshold amount, the process flow 500 may proceed to block 570 at which charging protection is disabled. As a result, if a subsequent wireless charger connection event is detected, the determination at determination block 520 will be negative. The process flow 500 may continue to block 540 at which the battery may be charged.

If the determination at determination block 560 is negative in that the battery has not been discharged by a first threshold amount, the process flow 500 may proceed to determination block 580 at which a determination may be made as to whether the battery has been de-coupled for a second threshold length of time. For example, the device may determine how long or an elapsed time since the battery has been de-coupled from a wireless charger. If the determination at determination block 580 is positive in that the battery has been de-coupled for the second threshold length of time, the process flow 500 may proceed to block 570 at which charging protection is disabled, and then to block 540 at which the battery is charged. If the determination at determination block 580 is negative in that the battery has not been de-coupled for the second threshold length of time, the process flow 500 may proceed to block 540 at which the battery is charged and charging protection remains enabled.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
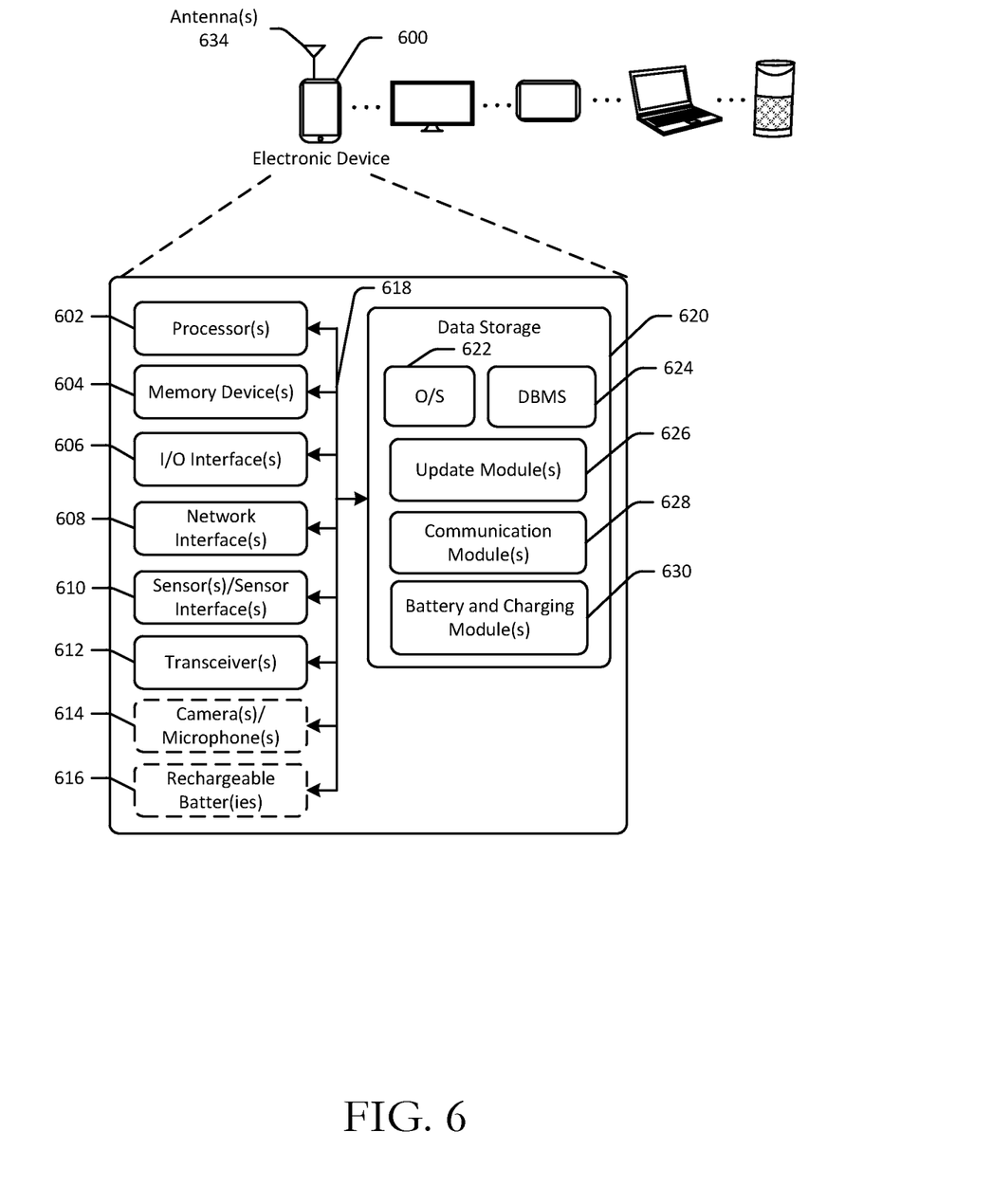
FIG. 6 schematically illustrates an example architecture of an electronic device in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a doorbell; a garden light; a spotlight; or the like. The electronic device(s) 600 may correspond to an illustrative device configuration for the device(s) of FIGS. 1-5.

The electronic device(s) 600 may be configured to communicate with one or more servers, user devices, or the like. The electronic device(s) 600 may be any suitable device, such as a mobile device, that is configured for wireless charging. The electronic device(s) 600 may be optionally configured to present content, detect sound, output digital content, and other functionality In some embodiments, a single remote server or a single group of remote servers may be configured to perform more than one type of functionality in conjunction with an electronic device.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a micro-wave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional camera(s) and/or microphone(s) 614, one or more optional rechargeable batteries 616, and data storage 620. The electronic device(s) 600 may further include one or more bus(es) 618 that functionally couple various components of the electronic device(s) 600. The electronic device(s) 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more update module(s) 626, one or more communication module(s) 628, and/or one or more battery and charging module(s) 630. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, historical data for previously identified products, purchase or order history, user profile information, and/or other information.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the update module(s) 626 may include computer-executable instructions, code, or the like that responsive to execution by one or more of the processor(s) 602 may perform functions including, but not limited to, requesting and/or receiving software updates, such as over-the-air updates, requesting battery voltage data, storing data, modifying charging rate values at integrated circuits, such as at a Power Management Integrated Circuit, controlling charging schemes and/or charging parameters, and the like.

The communication module(s) 628 may include computer-executable instructions, code, or the like that responsive to execution by one or more of the processor(s) 602 may perform functions including, but not limited to, sending and/or receiving data, including content, sending and/or receiving instructions and commands, and the like.

The battery and charging module(s) 630 may include computer-executable instructions, code, or the like that responsive to execution by one or more of the processor(s) 602 may perform functions including, but not limited to, determining a charging voltage or other charging parameter, determining a charging rate, calculating elapsed time, calculating battery environment values, adjusting charging voltages or charging rates, determining predicted usage, determining voltage and/or temperature data, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(s) 634— communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 614 may be any device configured to capture ambient light or images. The microphone(s) 614 may be any device configured to receive analog sound input or voice data. The rechargeable batter(ies) 616 may be any suitable power storage device, such as a lithium ion battery and may be in various form factors, such as pouch form factors, cylindrical form factors, and the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
    a battery;
    memory configured to store computer-executable instructions; and
    at least one computer processor configured to access the memory and execute the computer-executable instructions to:
        determine that the battery is coupled to a wireless charger;
        determine that the battery is de-coupled from the wireless charger at a first time;
        determine that the battery is re-coupled to the wireless charger at a second time;
        determine that the device was presenting audio-visual content at the second time;
        determine that a first elapsed time between the first time and the second time is less than one minute;
        determine that a first state of charge of the battery at the second time is at least 95%; and
        cause, for a time interval, charging of the battery to be disabled while the device is coupled to the wireless charger.

2. The device of claim 1, wherein the at least one processor is further configured to access the memory and execute the computer-executable instructions to:
    determine that the battery is still coupled to the wireless charger at a third time after the second time;
    determine that the battery is de-coupled from the wireless charger at a fourth time;
    determine, based at least in part on accelerometer data associated with the device, that a first value is greater than a threshold, wherein the first value represents a likelihood that the device was removed from the wireless charger;

determine that the battery is coupled to the wireless charger at a fifth time; and
cause wireless charging of the battery to be enabled.

3. The device of claim 1, wherein the at least one processor is further configured to access the memory and execute the computer-executable instructions to:
determine that the battery is still coupled to the wireless charger at a third time after the second time;
determine that the battery is de-coupled from the wireless charger at a fourth time;
determine that a second elapsed time between the third time and the fourth time is greater than 20 hours;
determine that the battery is re-coupled to the wireless charger at a fifth time after the fourth time;
determine that a third elapsed time between the fourth time and the fifth time is less than one minute; and
cause charging of the battery to be disabled.

4. The device of claim 1, wherein the at least one processor is further configured to access the memory and execute the computer-executable instructions to:
cause presentation of battery charging notifications and battery discharging notifications to be disabled during the time interval.

5. A device comprising:
a battery;
memory configured to store computer-executable instructions; and
at least one computer processor configured to access the memory and execute the computer-executable instructions to:
determine that the battery is de-coupled from a wireless charger at a first time;
determine that the battery is coupled to the wireless charger at a second time;
determine that a first elapsed time between the first time and the second time is equal to or less than a first threshold; and
cause charging of the battery to be disabled for a first time duration.

6. The device of claim 5, wherein the at least one processor is further configured to access the memory and execute the computer-executable instructions to:
determine that the device was presenting audio or video at the second time.

7. The device of claim 5, wherein the at least one processor is further configured to access the memory and execute the computer-executable instructions to:
prior to causing charging of the battery to be disabled, determine that a first state of charge of the battery before the second time indicates the battery is fully charged; and
determine that a second state of charge of the battery at the second time is equal to or greater than a second threshold.

8. The device of claim 5, wherein the at least one processor is further configured to access the memory and execute the computer-executable instructions to:
increment a wireless charging disconnect counter;
determine that a present value of the wireless charging disconnect counter is equal to or greater than a second threshold; and
cause a maximum charging voltage associated with the battery to be reduced for a second time duration.

9. The device of claim 8, wherein the second time duration is equal to or greater than double the first time duration.

10. The device of claim 5, wherein the at least one processor is further configured to access the memory and execute the computer-executable instructions to:
determine that the battery is coupled to the wireless charger at a third time;
determine that the battery is de-coupled from the wireless charger at a fourth time;
determine, based at least in part on accelerometer data associated with the device, that a first value is greater than a threshold, wherein the first value represents a likelihood that the device was removed from the wireless charger;
determine that the battery is coupled to the wireless charger at a fifth time; and
cause charging of the battery to be enabled.

11. The device of claim 10, wherein the at least one processor is further configured to access the memory and execute the computer-executable instructions to:
send the accelerometer data to a remote server; and
receive, from the remote server, an indication of device movement associated with user motion based on the accelerometer data.

12. The device of claim 10, wherein the at least one processor is further configured to access the memory and execute the computer-executable instructions to:
determine a device identifier associated with the wireless charger; and
determine a historical disconnect rate associated with the device identifier;
wherein the first value is determined based at least in part on the historical wireless disconnect rate.

13. The device of claim 5, wherein the at least one processor is further configured to access the memory and execute the computer-executable instructions to:
determine that the battery is coupled to the wireless charger at a third time;
determine that the battery is de-coupled from the wireless charger at a fourth time;
determine that a second elapsed time between the third time and the fourth time is equal to or greater than a second threshold;
determine that the battery is coupled to the wireless charger at a fifth time;
determine that a third elapsed time between the fourth time and the fifth time is less than a third threshold; and
cause charging of the battery to be disabled.

14. The device of claim 5, wherein the at least one processor is further configured to access the memory and execute the computer-executable instructions to:
cause presentation of battery charging notifications and battery discharging notifications to be disabled during the time duration.

15. The device of claim 5, wherein the at least one processor is further configured to access the memory and execute the computer-executable instructions to:
prior to causing charging of the battery to be disabled, determine that an ambient light level at the second time is equal to or greater than a second threshold.

16. A method comprising:
determining, by a device comprising a battery, that the battery is de-coupled from a wireless charger at a first time;
determining that the battery is coupled to the wireless charger at a second time;
determining that a first elapsed time between the first time and the second time is equal to or less than a first threshold; and causing charging of the battery to be disabled for a first time duration.

17. The method of claim 16, further comprising:
prior to causing charging of the battery to be disabled, determining that a first state of charge of the battery before the second time indicates the battery is fully charged; and
determining that a second state of charge of the battery at the second time is equal to or greater than a second threshold.

18. The method of claim 16, further comprising:
incrementing a wireless charging disconnect counter;
determining that the wireless charging disconnect counter is equal to or greater than a second threshold; and
causing a maximum charging voltage associated with the battery to be reduced for a second time duration.

19. The method of claim 16, further comprising:
determining that the battery is coupled to the wireless charger at a third time;
determining that the battery is de-coupled from the wireless charger at a fourth time;
determining that a first value indicative of a likelihood that the device was removed from the wireless charger is greater than a threshold;
determining that the battery is coupled to the wireless charger at a fifth time; and
causing charging of the battery to be enabled.

20. The method of claim 16, further comprising:
determining that the battery is coupled to the wireless charger at a third time;
determining that the battery is de-coupled from the wireless charger at a fourth time;
determining that a second elapsed time between the third time and the fourth time is equal to or greater than a second threshold;
determining that the battery is coupled to the wireless charger at a fifth time;
determining that a third elapsed time between the fourth time and the fifth time is less than a third threshold; and
causing charging of the battery to be disabled.

\* \* \* \* \*